United States Patent
Liu et al.

(10) Patent No.: US 9,819,385 B2
(45) Date of Patent: Nov. 14, 2017

(54) METHOD AND APPARATUS FOR INTERFERENCE CANCELLATION

(71) Applicant: Huawei Technologies Co., Ltd., Shenzhen (CN)

(72) Inventors: Sheng Liu, Shenzhen (CN); Teyan Chen, Shenzhen (CN); Hong Cheng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/337,407

(22) Filed: Oct. 28, 2016

(65) Prior Publication Data

US 2017/0047964 A1 Feb. 16, 2017

Related U.S. Application Data

(63) Continuation of application No. PCT/CN2014/076663, filed on Apr. 30, 2014.

(51) Int. Cl.
*H04B 1/525* (2015.01)
*H04B 15/00* (2006.01)
*H04B 5/02* (2006.01)
*H04W 56/00* (2009.01)
*H04W 88/02* (2009.01)
*H04W 88/08* (2009.01)

(52) U.S. Cl.
CPC .............. *H04B 1/525* (2013.01); *H04B 5/02* (2013.01); *H04B 15/00* (2013.01); *H04W 56/0015* (2013.01); *H04W 88/02* (2013.01); *H04W 88/08* (2013.01)

(58) Field of Classification Search
CPC ............................... H04B 1/525; H04B 15/00
See application file for complete search history.

(56) References Cited

U.S. PATENT DOCUMENTS

| 8,290,100 B2 * | 10/2012 | Komninakis | ............ H04B 1/10 324/76.23 |
| 2014/0273874 A1 * | 9/2014 | Clevorn | ............... H04B 7/0417 455/67.13 |

FOREIGN PATENT DOCUMENTS

| CN | 101296068 A | 10/2008 |
| CN | 101471694 A | 7/2009 |
| CN | 101882965 A | 11/2010 |
| CN | 101946416 A | 1/2011 |
| CN | 103427874 A | 12/2013 |

* cited by examiner

*Primary Examiner* — Tuan H Nguyen
(74) *Attorney, Agent, or Firm* — Slater Matsil, LLP

(57) ABSTRACT

A method for interference cancellation is provided. The method includes: determining, by a first base station, a channel parameter from a transmit antenna of a second base station to a receive antenna of the first base station; receiving, by the first base station, a first signal using a first resource, where the first signal includes: a first interference signal and an uplink wanted signal, and the first interference signal is an interference signal generated when a downlink second signal is sent by the second base station by using the first resource; receiving, by the first base station, reconstruction information that is of the second signal and that is sent by the second base station; and determining, by the first base station, the first interference signal in the first signal according to the channel parameter and the reconstruction information of the second signal, and canceling the first interference signal.

16 Claims, 4 Drawing Sheets

S110

| The first base station receives a second interference signal by using a second resource, where the second interference signal is an interference signal generated when a downlink third signal is sent by the second base station by using the second resource, and there is no uplink signal sent to the first base station by using the second resource | ∽ S111 |

| The first base station receives reconstruction information that is of the third signal and that is sent by the second base station, where a resource used for sending the reconstruction information of the third signal by the second base station is different from the second resource | ∽ S112 |

| The first base station determines the channel parameter from the transmit antenna of the second base station to the receive antenna of the first base station according to the second interference signal and the reconstruction information of the third signal | ∽ S113 |

| A second base station sends a downlink second signal by using a first resource, where a first base station receives a first signal by using the first resource, and the first signal includes: a first interference signal generated when the second signal is sent and an uplink usable signal | ∽ S210 |

| The second base station sends reconstruction information of the second signal to the first base station, so that the first base station determines the first interference signal in the first signal according to the reconstruction information of the second signal and a channel parameter from a transmit antenna of the second base station to a receive antenna of the first base station, and cancels the first interference signal, where a resource used for sending the reconstruction information of the second signal by the second base station is different from the first resource | ∽ S220 |

FIG. 4

METHOD AND APPARATUS FOR INTERFERENCE CANCELLATION

CROSS-REFERENCE TO RELATED APPLICATIONS

This application is a continuation of International Application No. PCT/CN2014/076663, filed on Apr. 30, 2014, the disclosure of which is hereby incorporated by reference in its entirety.

TECHNICAL FIELD

Embodiments of the present disclosure relate to the field of communications technologies, and more specifically, to a method and an apparatus for interference cancellation.

BACKGROUND

When a base station communicates with a terminal, the base station may be interfered with by another neighboring or adjacent base station. Specifically, when a base station receives, on a time-frequency resource, a wanted signal from a terminal, another neighboring or adjacent base station may send a signal to a terminal by using the same time-frequency resource. In this case, receiving a signal by the base station is affected by the signal that is sent by the neighboring or adjacent interfering base station, and the base station cannot correctly receive the wanted signal.

Generally, if the two neighboring or adjacent base stations do not have a full-duplex communications capability, an uplink resource used by one base station and a downlink resource used by the other base station may be set to be orthogonal when resource allocation is designed. However, with popularization of a full-duplex communications technology, a base station may perform, on a time-frequency resource, receiving and sending operations at the same time, and an interference problem between the two neighboring or adjacent base stations becomes particularly serious.

SUMMARY

Embodiments of the present disclosure provide a method and an apparatus for interference cancellation, which can perform cancellation on an interference signal between base stations in a received signal.

According to a first aspect, a method for interference cancellation is provided. The method includes: determining, by a first base station, a channel parameter from a transmit antenna of a second base station to a receive antenna of the first base station. The method also includes receiving, by the first base station, a first signal by using a first resource, where the first signal includes: a first interference signal and an uplink wanted signal, and the first interference signal is an interference signal generated when a downlink second signal is sent by the second base station by using the first resource. The method also includes receiving, by the first base station, reconstruction information that is of the second signal and that is sent by the second base station, where a resource used for sending the reconstruction information of the second signal by the second base station is different from the first resource. The method also includes determining, by the first base station, the first interference signal in the first signal according to the channel parameter and the reconstruction information of the second signal, and canceling the first interference signal.

According to a second aspect, a method for interference cancellation is provided. The method includes: sending, by a second base station, a downlink second signal by using a first resource, where a first base station receives a first signal by using the first resource, and the first signal includes: a first interference signal generated when the second signal is sent and an uplink wanted signal. The method also includes sending, by the second base station, reconstruction information of the second signal to the first base station, so that the first base station determines the first interference signal in the first signal according to the reconstruction information of the second signal and a channel parameter from a transmit antenna of the second base station to a receive antenna of the first base station, and cancels the first interference signal, where a resource used for sending the reconstruction information of the second signal by the second base station is different from the first resource.

According to a third aspect, an apparatus for interference cancellation is provided. The apparatus includes: a determining module 310, configured to determine a channel parameter from a transmit antenna of a second apparatus to a receive antenna of the apparatus. The apparatus also includes a first receiving module 320, configured to receive, a first signal by using a first resource, where the first signal includes: a first interference signal and an uplink wanted signal, and the first interference signal is an interference signal generated when a downlink second signal is sent on the first resource by the second apparatus. The apparatus also includes a second receiving module 330, configured to receive reconstruction information that is of the second signal and that is sent by the second apparatus, where a resource used for sending the reconstruction information of the second signal by the second apparatus is different from the first resource. The apparatus also includes an interference cancellation module 340, configured to determine the first interference signal in the first signal according to the channel parameter and the reconstruction information of the second signal, and cancel the first interference signal.

According to a fourth aspect, an apparatus for interference cancellation is provided. The apparatus includes: a first sending module 410, configured to send, a downlink second signal by using a first resource, where a first apparatus receives a first signal by using the first resource, and the first signal includes: a first interference signal generated when the second signal is sent and an uplink wanted signal. The apparatus also includes a second sending module 420, configured to send reconstruction information of the second signal to the first apparatus, so that the first apparatus determines the first interference signal in the first signal according to the reconstruction information of the second signal and a channel parameter from a transmit antenna of the apparatus to a receive antenna of the first apparatus, and cancels the first interference signal, where a resource used for sending the reconstruction information of the second signal by the apparatus is different from the first resource.

Based on the foregoing technical solutions, according to the methods and the apparatuses for interference cancellation provided in the embodiments of the present disclosure, an interfered base station may implement, according to reconstruction information that is of an uplink signal and that is sent by an interfering base station, in combination with a channel parameter between two base stations, cancellation of an interference signal generated when the uplink signal is sent by the interfering base station.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 3 is a schematic flowchart of a method for interference cancellation according to another embodiment of the present disclosure;

FIG. 4 is a schematic flowchart of a method for interference cancellation according to another embodiment of the present disclosure;

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
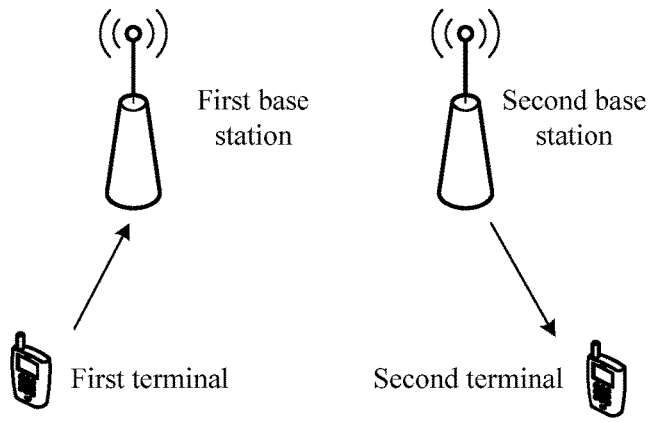
FIG. 1 is a schematic diagram of a scenario in which a method for interference cancellation according to an embodiment of the present disclosure is applied.

FIG. 1 shows a schematic diagram of a scenario in which a method for interference cancellation according to an embodiment of the present disclosure is applied. In the scenario shown in FIG. 1, two neighboring or adjacent base stations respectively communicate with terminals. A time-frequency resource on which a first base station receives a signal that is sent by a first terminal may be the same as a time-frequency resource on which a neighboring or adjacent second base station sends a signal to a second terminal. In this case, the second base station that sends a signal interferes with the first base station that receives a signal, and the first base station cannot correctly receive a wanted signal from the first terminal.

Generally, if the two neighboring or adjacent base stations do not have a full-duplex communications capability, an uplink resource used by one base station and a downlink resource used by the other base station may be set to be orthogonal when resource allocation is designed. However, with popularization of a full-duplex communications technology, a base station may perform, on a time-frequency resource, receiving and sending operations at the same time, and an interference problem between the two neighboring or adjacent base stations becomes particularly serious. An embodiment of the present disclosure provides a solution to interference cancellation for the foregoing described interference signal between base stations. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The following briefly describes a principle of the solution in this embodiment of the present disclosure with reference to a related formula. It is assumed that base stations in two neighboring cells perform, by using a same time-frequency resource, full-duplex communication with terminals in cells to which the base stations respectively belong, and an interfered base station receives both an interference signal from the other base station and a wanted signal that is sent by the terminal in a cell to which the interfered base station belongs, where a received signal y may be indicated as:

$$y = h_{self}^H x_{self} + h_{BS}^H x_{BS} + h_{UE}^H x_{UE} + n$$

where $h_{self}$, $h_{BS}$, and $h_{UE}$ are respectively channel parameters of a self-interference channel, an inter-base station channel, and a communication channel, and $x_{self}$, $x_{BS}$, and $x_{UE}$ are respectively a signal sent by the base station, a signal sent by the base station that generates interference, and a signal sent by the terminal in the cell. It may be learned from the foregoing expression that, if a wanted signal that is sent by the terminal needs to be obtained from the signal y, interference parts $h_{self} x_{self}$ and $h_{BS} x_{BS}$ need to be canceled. Cancellation of $h_{self} x_{self}$, that is, cancellation of a self-interference signal, is not described in this embodiment of the present disclosure, and only cancellation of an interference signal $h_{BS} x_{BS}$ between base stations is discussed. To perform cancellation on the interference signal between the base stations, an inter-base station channel parameter $h_{BS}$ and a signal $x_{BS}$ sent by the base station that generates interference need to be obtained. $h_{BS}$ may be obtained by means of channel estimation or by using another method, and $x_{BS}$ may be obtained from the base station that generates interference. For ease of description, an $h_{BS} x_{BS}$ part in the signal received by the interfered base station is referred to as an interference signal below, such as a first interference signal and a second interference signal.

It should be understood that in this embodiment of the present disclosure, a terminal is an access terminal using a wireless full-duplex technology or a wireless half-duplex technology, and may also be referred to as a system, a user unit, a user station, a mobile station, a remote station, a remote terminal, a mobile device, a user terminal, a terminal, a wireless communications device, a user agent, a user apparatus, or user equipment (UE). The terminal may be a cellular phone, a cordless phone, a SIP (Session Initiation Protocol) phone, a WLL (Wireless Local Loop) station, a PDA (Personal Digital Assistant), a handheld device having a wireless communication function, an in-vehicle device, a computing device, or another processing device that is connected to a wireless modem.

It should be further understood that in this embodiment of the present disclosure, the base station may be configured to communicate with a mobile device, and the base station may be an AP (Access Point) of Wi-Fi, or a BTS (Base Transceiver Station) in GSM (Global System for Mobile communication) or CDMA (Code Division Multiple Access), or may be an NB (NodeB) in WCDMA (Wideband Code Division Multiple Access), or may be an eNB or an eNodeB (evolved NodeB) in LTE (Long Term Evolution), or a relay station or an access point, or a base station device in a future 5G network, or the like.

It should be further understood that FIG. 1 shows only a typical scenario in which the method for interference cancellation in this embodiment of the present disclosure is applied. In an application scenario, multiple base stations like the first base station or the second base station may be further included, or multiple terminals like the first terminal or the second terminal may be included, which is not limited in the embodiment of the present disclosure.

Figure 2:
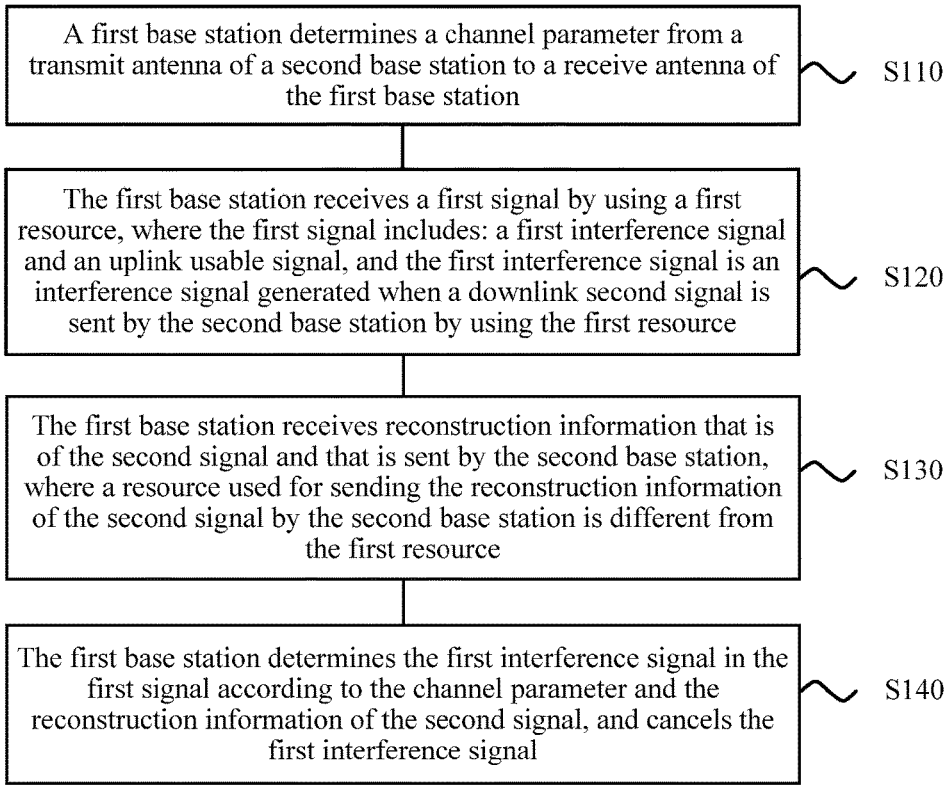
FIG. 2 is a schematic flowchart of a method for interference cancellation according to an embodiment of the present disclosure.

FIG. 2 shows a method 100 for interference cancellation according to an embodiment of the present disclosure, where the method 100 may be executed by an interfered base station, that is, a first base station. As shown in FIG. 2, the method 100 includes the following steps.

S110. A first base station determines a channel parameter from a transmit antenna of a second base station to a receive antenna of the first base station.

S120. The first base station receives, a first signal by using a first resource, where the first signal includes: a first interference signal and an uplink wanted signal, and the first interference signal is an interference signal generated when a downlink second signal is sent by the second base station by using the first resource.

S130. The first base station receives reconstruction information that is of the second signal and that is sent by the second base station, where a resource used for sending the reconstruction information of the second signal by the second base station is different from the first resource.

S140. The first base station determines the first interference signal in the first signal according to the channel parameter and the reconstruction information of the second signal, and cancels the first interference signal.

Therefore, in the method for interference cancellation provided in this embodiment of the present disclosure, a first base station can implement, according to reconstruction information that is of a downlink signal and that is sent on a first resource by a second base station and with reference to a channel parameter from a transmit antenna of the second base station to a receive antenna of the first base station, cancellation of an interference signal between base stations on a signal received on the first resource.

In S110, the first base station may determine the channel parameter from the transmit antenna of the second base station to the receive antenna of the first base station in multiple manners. Optionally, as shown in FIG. 3, as an embodiment, S110 may include the following steps.

S111. The first base station receives a second interference signal by using a second resource, where the second interference signal is an interference signal generated when a downlink third signal is sent by the second base station by using the second resource, and there is no uplink signal sent to the first base station by using the second resource.

S112. The first base station receives reconstruction information that is of the third signal and that is sent by the second base station, where a resource used for sending the reconstruction information of the third signal by the second base station is different from the second resource.

S113. The first base station determines the channel parameter from the transmit antenna of the second base station to the receive antenna of the first base station according to the second interference signal and the reconstruction information of the third signal.

Because there is no uplink signal sent to the first base station by using the second resource, that is, a terminal does not send a signal to the first base station, and if the first base station does not send a signal on the second resource, a signal received by the first base station may be approximately considered as a second interference signal generated when the third signal is sent by the second base station. The third signal may be obtained by means of reconstruction according to the reconstruction information of the third signal, and then the channel parameter, such as an amplitude and a phase, from the transmit antenna of the second base station to the receive antenna of the first base station may be estimated according to the second interference signal and the third signal obtained by means of reconstruction.

It should be understood that, if on the second resource, the first base station receives the second interference signal and sends a signal at the same time, self-interference cancellation may first be performed on a received signal when the channel parameter is estimated. A residual signal after the self-interference cancellation may be approximately considered as the second interference signal, which is not limited in the embodiment of the present disclosure.

Optionally, some changes may be made to the foregoing embodiment so as to determine the channel parameter from the transmit antenna of the second base station to the receive antenna of the first base station. For example, the third signal sent by the second base station by using the second resource is a fixed signal pre-agreed upon by the first base station and the second base station. The third signal is used only for testing the channel parameter between the two base stations, but not a downlink signal sent to a terminal. In this case, because the third signal is the pre-agreed fixed signal, the second base station does not need to send the reconstruction information of the third signal to the first base station, but a time-frequency resource that is specially used for estimating the channel parameter needs to be allocated to each of the two base stations. Compared with allocating the time-frequency resource that is specially used for estimating the channel parameter to each of the two base stations, the solution provided in S111 to S113 may reduce resource consumption to a large extent.

It should be understood that the channel parameter between base stations may further be estimated according to configuration information and/or location information of a base station, which is not limited in the embodiment of the present disclosure.

Generally, a distance between neighboring base stations is about several kilometers or more, and a distance between a terminal and a base station is about hundreds of meters. A ratio between a path loss power that is between neighboring base stations and a path loss power that is between a base station and a terminal is generally greater than 5 dB, and a ratio between a transmit power of a base station and a transmit power of a terminal is generally about 20 dB. Therefore, for a base station, a power ratio between an interference signal received from a neighboring base station by the base station and a wanted signal received from a terminal by the base station is generally less than 15 dB. Within this power ratio range, interference between base stations generally needs to be canceled only on a digital baseband, which is not limited in the embodiment of the present disclosure.

Optionally, as a specific embodiment, the reconstruction information of the second signal may include: an unmodulated digital baseband signal and a modulation scheme that are corresponding to the second signal; and the reconstruction information of the third signal may include: an unmodulated digital baseband signal and a modulation scheme that are corresponding to the third signal.

In S111, the second resource is a resource used for estimating the channel parameter between base stations by the first base station. After processing the received second interference signal by using a low noise amplifier (LNA), a down-converter, an analog-to-digital converter (ADC), and the like, the first base station may obtain a digital baseband signal that is corresponding to the second interference signal.

In S112, the first base station may receive, by using an out-of-band resource, the reconstruction information that is of the third signal and that is sent by the second base station, where the reconstruction information of the third signal includes the unmodulated digital baseband signal and the modulation scheme that are corresponding to the third signal. The out-of-band resource refers to a resource except a time-frequency resource that is preset to be used by a base station and a terminal to perform communication, for example, the second base station may send the reconstruction information of the third signal to the first base station by using an optical fiber, a microwave, or a cable.

The second base station may send the reconstruction information of the third signal to the first base station and the downlink third signal to the terminal at the same time; or before sending the downlink third signal to the terminal, the second base station may send the reconstruction information of the third signal to the first base station in advance. With the foregoing measures, after receiving the second interference signal, the first base station may estimate the channel parameter according to the reconstruction information of the third signal in a timely manner, so as to avoid causing a delay.

In S113, the first base station may obtain, by means of reconstruction according to the unmodulated digital baseband signal and the modulation scheme that are corresponding to the third signal, the third signal that is sent by the second base station by using the first resource, where a third signal obtained by means of reconstruction is a modulated digital baseband signal. The channel parameter from the transmit antenna of the second base station to the receive antenna of the first base station may be estimated according to the digital baseband signal that is corresponding to the second interference signal and the third signal obtained by means of reconstruction. Generally, because a location of a base station is fixed, if there is no significant change to an environment in which the base station is located, the channel parameter may be considered as unchanged over a period of time. Therefore, the channel parameter may be used for interference cancellation between base stations on the first resource, where a use time of the first resource is close to that of the second resource.

In S120, the first resource is a resource required by the first base station to perform interference cancellation between base stations. The first signal received on the first resource by the first base station includes: the first interference signal and the uplink wanted signal, and the first interference signal is the interference signal generated when the downlink second signal is sent by the second base station by using the first resource. The interference cancellation between base stations is performed to cancel the first interference signal. The first base station may process the received first signal by using the LNA, the down-converter, the ADC, and the like, so as to obtain a digital baseband signal that is corresponding to the first signal.

In S130, the first base station may receive, by using an out-of-band resource, the reconstruction information that is of the second signal and that is sent by the second base station, where the reconstruction information of the second signal includes the unmodulated digital baseband signal and the modulation scheme that are corresponding to the second signal. As with the obtaining the channel parameter from the transmit antenna of the second base station to the receive antenna of the first base station, to perform interference cancellation in a timely manner and avoid causing a delay, the second base station may send the reconstruction information of the second signal to the first base station and the downlink second signal to the terminal at the same time; or before sending the downlink second signal to the terminal, the second base station may send the reconstruction information of the second signal to the first base station in advance.

In S140, the first base station may obtain, by means of reconstruction according to the unmodulated digital baseband signal and the modulation scheme that are corresponding to the second signal, the downlink second signal that is sent by the second base station by using the first resource, where the second signal obtained by means of reconstruction is a modulated digital baseband signal. The first interference signal received on the first resource by the first base station may be determined according to the second signal obtained by means of reconstruction and the channel parameter obtained in S113. The first interference signal may be canceled from the digital baseband signal that is corresponding to the first signal, so as to obtain a digital baseband signal that is corresponding to the wanted signal in the first signal.

It should be understood that in this embodiment of the present disclosure, the first base station may not reconstruct the second signal, and the first interference signal in the first signal received on the second resource by the first base station is estimated directly according to the reconstruction information of the second signal and the channel parameter obtained in S113, which is not limited in the embodiment of the present disclosure. It should be further understood that, if the first base station further sends a signal on the first resource, the self-interference cancellation may further be performed on the first signal, before digital interference cancellation between base stations is performed, which is not limited in the embodiment of the present disclosure.

In this embodiment of the present disclosure, reconstructing the second signal and the third signal refers to reconstructing the modulated digital baseband signal of the second signal and the third signal; in addition to the reconstructing and obtaining the second signal and the third signal according to the unmodulated digital baseband signal and the modulation scheme, the modulated digital baseband signal may be further obtained directly from the second base station.

In addition, when the channel parameter is estimated and the interference cancellation is performed, if the second base station estimates that a radio frequency channel linearity is insufficient, a non-linear estimation of the radio frequency channel further needs to be sent to the first base station. Accordingly, the reconstruction information of the second signal further includes: a non-linear estimation of a radio frequency channel of the second signal; and the reconstruction information of the third signal further includes: a non-linear estimation of a radio frequency channel of the third signal.

In this embodiment of the present disclosure, the reconstruction information of the second signal and the reconstruction information of the third signal that are sent by the second base station to the first base station include digital baseband reference signals. Therefore, in this embodiment of the present disclosure, a requirement for a transmission medium is not high, and transmission may be performed only by using a microwave or a common cable, which is not limited by the embodiment of the present disclosure.

Optionally, as another specific embodiment, the reconstruction information of the second signal includes: a radio frequency signal that is corresponding to the second signal; and the reconstruction information of the third signal includes: a radio frequency signal that is corresponding to the third signal.

In this specific embodiment, a method for obtaining the channel parameter from the transmit antenna of the second base station to the receive antenna of the first base station may be similar to the method described in S111 to S113 in the foregoing embodiment. A difference lies in that in S112 of this specific embodiment, the reconstruction information that is of the third signal and that is sent by the second base station and received by the first base station by using an out-of-band resource includes the radio frequency signal that is corresponding to the third signal. In S113, the first base station may process the radio frequency signal that is corresponding to the third signal by using the down-converter, a low pass filter (LPF), and the ADC, so as to obtain a digital baseband signal that is corresponding to the third signal. The channel parameter from the transmit antenna of the second base station to the receive antenna of the first base station may be estimated according to the digital baseband signal that is corresponding to the second interference signal and the digital baseband signal that is corresponding to the third signal, where the channel parameter may be used for interference cancellation between base stations on the first resource, and a use time of the first resource is close to that of the second resource. Likewise, if on the second resource, the first base station receives the second interference signal and sends a signal at the same time, the self-interference cancellation may first be performed when the channel parameter is estimated. The second base station may send the reconstruction information of the third signal to the first base station and the downlink third signal to the terminal at the same time; or before sending the downlink third signal to the terminal, the second base station may send the reconstruction information of the third signal to the first base station in advance.

In S120, the first resource is a resource required by the first base station to perform interference cancellation between base stations. The first signal received on the first resource by the first base station includes: the first interference signal and the uplink wanted signal. In S130, the first base station may receive, by using an out-of-band resource, the reconstruction information that is of the second signal and that is sent by the second base station, where the reconstruction information of the second signal includes the radio frequency signal that is corresponding to the second signal. Likewise, the second base station may send the reconstruction information of the second signal to the first base station and the downlink second signal to the terminal at the same time; or before sending the downlink second signal to the terminal, the second base station may send the reconstruction information of the second signal to the first base station in advance.

In S140, the first base station may process the received first signal by using the LNA, the down-converter, the ADC, and the like, so as to obtain a digital baseband signal that is corresponding to the first signal. The first base station may further perform processing such as down-conversion, LPF, ADC, and the like on the radio frequency signal that is corresponding to the second signal, so as to obtain a digital baseband signal that is corresponding to the second signal. A digital baseband signal that is corresponding to the first interference signal may be determined according to the digital baseband signal that is corresponding to the second signal and the channel parameter obtained in S113. The first base station cancels the digital baseband signal that is corresponding to the first interference signal from the digital baseband signal that is corresponding to the first signal, so as to obtain the wanted signal in the first signal.

In this embodiment of the present disclosure, the reconstruction information of the second signal and the reconstruction information of the third signal that are sent by the second base station to the first base station include a radio frequency signal. Therefore, even if the radio frequency channel linearity of the second base station is insufficient, the non-linear estimation of the radio frequency channel does not need to be sent to the first base station in addition. The first base station may obtain a baseband reference signal from the received radio frequency signal, where the baseband reference signal carries non-linearity of a transmit channel.

It should be understood that in the embodiments of the present disclosure, the reconstruction information that is of the second signal and that is received by the first base station and sent by the second base station and/or the reconstruction information that is of the third signal and that is received by the first base station and sent by the second base station may be transmitted by using an optical fiber, a microwave, or a common cable. For example, if the first base station and the second base station are micro base stations deployed in a form of a heterogeneous network (HetNet), the micro base stations may communicate with a macro base station by using the microwave, the optical fiber, or the common cable, and then communication between the first base station and the second base station may be implemented. When the reconstruction information of the second signal and the reconstruction information of the third signal that are sent by the second base station to the first base station include a radio frequency signal, a loss may be reduced by using the optical fiber to perform transmission, so that quality of the transmitted radio frequency signal is guaranteed. In addition, in the embodiments of the present disclosure, another realizable direct communication manner may be used, which is not limited in the embodiment of the present disclosure.

It should be understood that any resource may be used as the second resource to estimate the channel parameter, provided that the resource meets a condition of channel parameter estimation. Therefore, the channel parameter between base stations may be measured in real time, so as to obtain latest channel parameter information between base stations, so that a channel parameter used for interference cancellation between base stations on the first resource is more accurate, and a better interference cancellation effect may be achieved.

Therefore, in the method for interference cancellation provided in this embodiment of the present disclosure, a first base station may accurately estimate a channel parameter between base stations according to reconstruction information that is of a downlink signal and that is sent on a second resource by a second base station, and the channel parameter between base stations is applied in interference cancellation on a signal received on a first resource, so that a better interference cancellation effect may be obtained.

It should be understood that in this embodiment of the present disclosure, use of a resource by each terminal is scheduled by a base station. The first base station and the second base station may send their respective resource allocation conditions to each other, so that the first base station and the second base station may determine the second resource used for estimating the channel parameter and the first resource used for performing the interference cancellation. In this embodiment of the present disclosure, each base station only needs to inform an interfered base station of a downlink resource used by the base station itself. In addition, when the reference signal sent from the second base station to the first base station is a radio frequency signal, the second base station does not need to inform the first base station of a downlink resource used by the second base station. The first base station may learn, by receiving the radio frequency reference signal, the downlink resource used by the second base station. Methods for determining, by the base station, a resource used for determining the channel parameter or performing the interference cancellation may further include some other feasible methods, which are not limited in the embodiment of the present disclosure.

It should be further understood that in this embodiment of the present disclosure, the interference cancellation may refer to canceling all interference components in a signal (including a main-path interference signal and a near-field interference signal), or may refer to canceling a part of the interference components (including a part of the main-path interference signal and a part of the near-field interference signal).

FIG. 4 shows a schematic flowchart of a method 200 for interference cancellation according to an embodiment of the present disclosure, where the method 200 may be executed by an interfering base station, that is, a second base station. As shown in FIG. 4, the method 200 includes the following steps.

S210. A second base station sends, a downlink second signal by using a first resource, where a first base station receives a first signal by using the first resource, and the first signal includes: a first interference signal generated when the second signal is sent and an uplink wanted signal.

S220. The second base station sends reconstruction information of the second signal to the first base station, so that the first base station determines the first interference signal in the first signal according to the reconstruction information of the second signal and a channel parameter from a transmit antenna of the second base station to a receive antenna of the first base station, and cancels the first interference signal, where a resource used for sending the reconstruction information of the second signal by the second base station is different from the first resource.

Therefore, in the method for interference cancellation provided in this embodiment of the present disclosure, reconstruction information that is of a downlink signal and that is sent on a first resource by a second base station is sent to a first base station, so that the first base station can implement, according to the reconstruction information and a channel parameter between base stations, cancellation of an interference signal between base stations on a signal received on the first resource.

Optionally, as an embodiment, before S210 is performed, the method 200 may further include: the second base station sends, on a second resource, a downlink third signal, where there is no uplink signal sent to the first base station by using the second resource, and the first base station receives, on the second resource, a second interference signal generated when the third signal is sent; and the second base station sends, reconstruction information of the third signal to the first base station, so that the first base station determines the channel parameter from the transmit antenna of the second base station to the receive antenna of the first base station according to the reconstruction information of the third signal and the second interference signal, where a resource used for sending the reconstruction information of the third signal by the second base station is different from the second resource.

Optionally, as a specific embodiment, the reconstruction information of the second signal includes: an unmodulated digital baseband signal and a modulation scheme that are corresponding to the second signal; and the reconstruction information of the third signal includes: an unmodulated digital baseband signal and a modulation scheme that are corresponding to the third signal.

Optionally, when a radio frequency channel linearity is insufficient, the reconstruction information of the second signal further includes: a non-linear estimation of a radio frequency channel of the second signal; and the reconstruction information of the third signal further includes: a non-linear estimation of a radio frequency channel of the third signal.

Optionally, as another specific embodiment, the reconstruction information of the second signal includes: a radio frequency signal that is corresponding to the second signal; and the reconstruction information of the third signal includes: a radio frequency signal that is corresponding to the third signal.

It should be understood that, that the second base station sends the reconstruction information of the third signal to the first base station may include: sending, by the second base station, the reconstruction information of the third signal to the first base station by using an optical fiber, a microwave, or a cable.

It should be understood that, that the second base station sends the reconstruction information of the second signal to the first base station may include: sending, by the second base station, the reconstruction information of the second signal to the first base station by using an optical fiber, a microwave, or a cable.

Therefore, in the method for interference cancellation provided in this embodiment of the present disclosure, reconstruction information that is of a downlink signal and that is sent on a second resource by a second base station is sent to a first base station, so that the first base station may accurately estimate a channel parameter between base stations according to the reconstruction information, and the channel parameter between base stations is applied in interference cancellation on a signal received on a first resource, so that a better interference cancellation effect may be obtained.

It should be understood that sequence numbers of the foregoing processes do not mean execution sequences in various embodiments of the present disclosure. The execution sequences of the processes should be determined according to functions and internal logic of the processes, and shall not be construed as any limitation on the implementation processes of the embodiments of the present disclosure.

The method for interference cancellation according to the embodiments of the present disclosure is described above in detail with reference to FIG. 2 to FIG. 4. An apparatus for interference cancellation according to the embodiments of the present disclosure are described below in detail with reference to FIG. 5 to FIG. 7.

Figure 5:
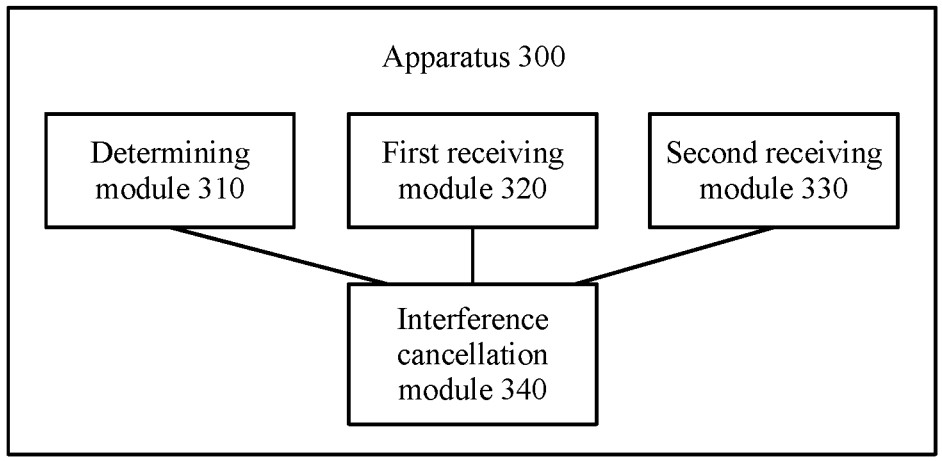
FIG. 5 is a schematic block diagram of an apparatus for interference cancellation according to an embodiment of the present disclosure.

FIG. 5 shows a schematic block diagram of an apparatus 300 for interference cancellation according to an embodiment of the present disclosure. As shown in FIG. 5, the apparatus 300 includes: a determining module 310, configured to determine a channel parameter from a transmit antenna of a second apparatus to a receive antenna of the apparatus. The apparatus also includes a first receiving module 320, configured to receive, a first signal by using a first resource, where the first signal includes: a first interference signal and an uplink wanted signal, and the first interference signal is an interference signal generated when a downlink second signal is sent on the first resource by the second apparatus. The apparatus also includes a second receiving module 330, configured to receive reconstruction information that is of the second signal and that is sent by the second apparatus, where a resource used for sending the reconstruction information of the second signal by the second apparatus is different from the first resource. The apparatus also includes an interference cancellation module 340, configured to determine the first interference signal in the first signal according to the channel parameter and the reconstruction information of the second signal, and cancel the first interference signal.

Therefore, according to the apparatus for interference cancellation provided in this embodiment of the present disclosure, according to reconstruction information that is of a downlink signal and that is sent on a first resource by a second apparatus, in combination with a channel parameter from a transmit antenna of the second apparatus to a receive antenna of a first apparatus, cancellation of an interference signal between apparatuses can be performed on a signal received on the first resource.

Figure 6:
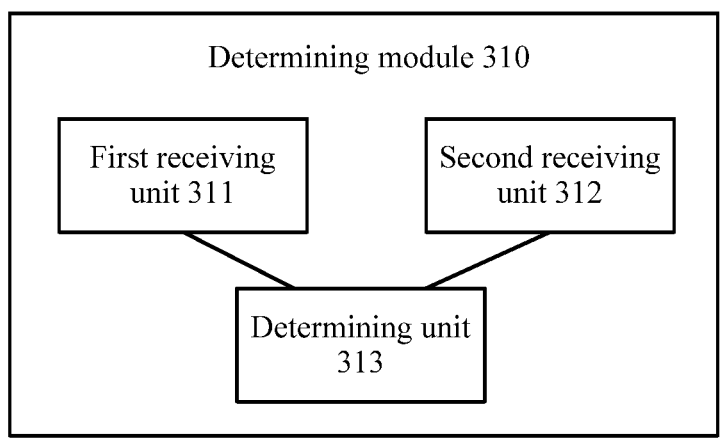
FIG. 6 is a schematic block diagram of a determining module according to an embodiment of the present disclosure.

Optionally, as shown in FIG. 6, as an embodiment, the determining module 310 includes: a first receiving unit 311, configured to receive, a second interference signal by using a second resource, where the second interference signal is an interference signal generated when a downlink third signal is sent on the second resource by the second apparatus, and on the second resource, there is no uplink signal sent to the apparatus; a second receiving unit 312, configured to receive reconstruction information that is of the third signal and that is sent by the second apparatus, where a resource used for sending the reconstruction information of the third signal by the second apparatus is different from the second resource; and a determining unit 313, configured to determine the channel parameter from the transmit antenna of the second apparatus to the receive antenna of the apparatus according to the second interference signal and the reconstruction information of the third signal.

Optionally, as a specific embodiment, the reconstruction information that is of the second signal and that is received by the second receiving module 330 includes: an unmodulated digital baseband signal and a modulation scheme that are corresponding to the second signal; and the reconstruction information that is of the third signal and that is received by the second receiving unit 312 includes: an unmodulated digital baseband signal and a modulation scheme that are corresponding to the third signal.

Optionally, the reconstruction information that is of the second signal and that is received by the second receiving module 330 further includes: a non-linear estimation of a radio frequency channel of the second signal; and the reconstruction information that is of the third signal and that is received by the second receiving unit 312 further includes: a non-linear estimation of a radio frequency channel of the third signal.

Optionally, as another specific embodiment, the reconstruction information that is of the second signal and that is received by the second receiving module 330 includes: a radio frequency signal that is corresponding to the second signal; and the reconstruction information that is of the third signal and that is received by the second receiving unit 312 includes: a radio frequency signal that is corresponding to the third signal.

It should be understood that the second receiving unit 312 may be specifically configured to receive, by using an optical fiber, a microwave, or a cable, the reconstruction information that is of the third signal and that is sent by the second apparatus.

It should be understood that the second receiving module 330 may be specifically configured to receive, an optical fiber, a microwave, or a cable, the reconstruction information that is of the second signal and that is sent by the second apparatus.

It should be further understood that the apparatus 300 for interference cancellation may be a base station, a relay station, an access point, or the like, or may be another apparatus that can perform or partially perform functions of a base station.

Therefore, according to the apparatus for interference cancellation provided in this embodiment of the present disclosure, a channel parameter between apparatuses may be accurately estimated according to reconstruction information that is of a downlink signal and that is sent on a second resource by a second apparatus, and the channel parameter between apparatuses is applied in interference cancellation on a signal received on a first resource, so that a better interference cancellation effect may be obtained.

Figure 7:
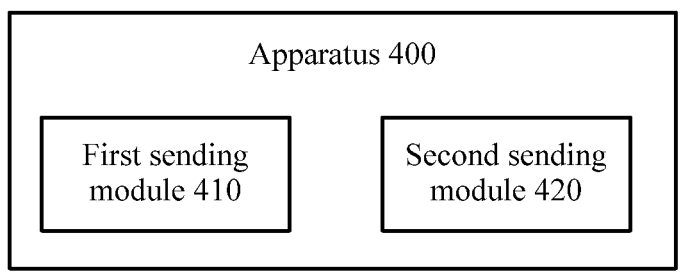
FIG. 7 is a schematic block diagram of an apparatus for interference cancellation according to another embodiment of the present disclosure.

FIG. 7 shows a schematic block diagram of an apparatus 400 for interference cancellation according to an embodiment of the present disclosure. As shown in FIG. 7, the apparatus 400 includes: a first sending module 410, configured to send, a downlink second signal by using a first resource, where a first apparatus receives a first signal by using the first resource, and the first signal includes: a first interference signal generated when the second signal is sent and an uplink wanted signal; and a second sending module 420, configured to send reconstruction information of the second signal to the first apparatus, so that the first apparatus determines the first interference signal in the first signal according to the reconstruction information of the second signal and a channel parameter from a transmit antenna of the apparatus to a receive antenna of the first apparatus, and cancels the first interference signal, where a resource used for sending the reconstruction information of the second signal by the apparatus is different from the first resource.

Therefore, according to the apparatus for interference cancellation provided in this embodiment of the present disclosure, reconstruction information that is of a downlink signal and that is sent on a first resource by the apparatus is sent to a first apparatus, so that the first apparatus may implement, according to the reconstruction information and a channel parameter between apparatuses, cancellation of an interference signal between apparatuses on a signal received on the first resource.

Optionally, as an embodiment, the apparatus 400 may further include: a third sending module, configured to send, on a second resource, a downlink third signal, where on the second resource, there is no uplink signal sent to the first apparatus, and the first apparatus receives, on the second resource, a second interference signal generated when the third signal is sent; and a fourth sending module, configured to send reconstruction information of the third signal to the first apparatus, so that the first apparatus determines the channel parameter from the transmit antenna of the apparatus to the receive antenna of the first apparatus according to the reconstruction information of the third signal and the second interference signal, where a resource used for sending the reconstruction information of the third signal by the apparatus is different from the second resource.

Optionally, as a specific embodiment, the reconstruction information that is of the second signal and that is sent by the second sending module 420 includes: an unmodulated digital baseband signal and a modulation scheme that are corresponding to the second signal; and the reconstruction information that is of the third signal and that is sent by the fourth sending module includes: an unmodulated digital baseband signal and a modulation scheme that are corresponding to the third signal.

Optionally, the reconstruction information that is of the second signal and that is sent by the second sending module 420 further includes: a non-linear estimation of a radio frequency channel of the second signal; and the reconstruction information that is of the third signal and that is sent by the fourth sending module further includes: a non-linear estimation of a radio frequency channel of the third signal.

Optionally, as another specific embodiment, the reconstruction information that is of the second signal and that is sent by the second sending module 420 includes: a radio frequency signal that is corresponding to the second signal; and the reconstruction information that is of the third signal and that is sent by the fourth sending module includes: a radio frequency signal that is corresponding to the third signal.

It should be understood that the fourth sending module may be specifically configured to send the reconstruction information of the third signal to the first apparatus by using an optical fiber, a microwave, or a cable.

It should be understood that the second sending module 420 may be specifically configured to send the reconstruction information of the second signal to the first apparatus by using an optical fiber, a microwave, or a cable.

It should be further understood that the apparatus 400 for interference cancellation may be a base station, a relay station, an access point, or the like, or may be another apparatus that can perform or partially perform functions of a base station. Therefore, according to the apparatus for interference cancellation provided in this embodiment of the present disclosure, reconstruction information that is of a downlink signal and that is sent on a second resource by an apparatus is sent to a first apparatus, so that the first apparatus may accurately estimate a channel parameter between apparatuses according to the reconstruction information, and the channel parameter between apparatuses is applied in interference cancellation on a signal received on a first resource, so that a better interference cancellation effect may be obtained.

Figure 8:
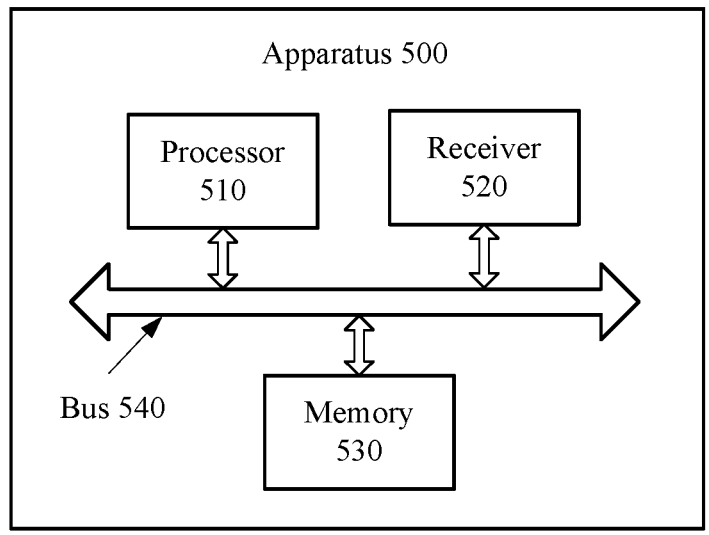
FIG. 8 is a schematic block diagram of an apparatus for interference cancellation according to another embodiment of the present disclosure.

FIG. 8 shows a schematic block diagram of an apparatus 500 for interference cancellation according to another embodiment of the present disclosure. As shown in FIG. 8, the apparatus 500 includes a processor 510, a receiver 520, a memory 530, and a bus 540. The processor 510, the receiver 520, and the memory 530 are connected by using the bus system 540. The memory 530 is configured to store an instruction. The processor 510 is configured to execute the instruction stored in the memory 530. The receiver 520 is configured to: receive, a first signal by using a first resource, where the first signal includes: a first interference signal and an uplink wanted signal, and the first interference signal is an interference signal generated when a downlink second signal is sent on the first resource by the second apparatus; and receive reconstruction information that is of the second signal and that is sent by the second apparatus, where a resource used for sending the reconstruction information of the second signal by the second apparatus is different from the first resource.

The processor 510 is configured to: determine a channel parameter from a transmit antenna of the second apparatus to a receive antenna of the apparatus 500; and determine the first interference signal in the first signal according to the channel parameter and the reconstruction information of the second signal, and cancel the first interference signal.

Therefore, according to the apparatus for interference cancellation provided in this embodiment of the present disclosure, according to reconstruction information that is of a downlink signal and that is sent on a first resource by a second apparatus, in combination with a channel parameter from a transmit antenna of the second apparatus to a receive antenna of a first apparatus, cancellation of an interference signal between apparatuses can be performed on a signal received on the first resource.

It should be understood that in this embodiment of the present disclosure, the processor 510 may be a central processing unit (CPU), or the processor 510 may be another general purpose processor, a digital signal processor (DSP), an application-specific integrated circuit (ASIC), a field programmable gate array (FPGA), or another programmable logic device, a discrete gate or a transistor logic device, a discrete hardware assembly, or the like. The general purpose processor may be a microprocessor, or the processor may also be any conventional processor, or the like.

The memory 530 may include a read-only memory and a random access memory, and provide an instruction and data to the processor 510. A part of the memory 530 may further include a non-volatile random access memory. For example, the memory 530 may further store information about a device type.

In addition to a data bus, the bus system 540 may further include a power bus, a control bus, a status signal bus, and the like. However, for clarity of description, various buses are marked as the bus system 540 in the figure.

In an implementation process, steps in the foregoing method may be implemented by using an integrated logic circuit of hardware in the processor 510 or an instruction in a form of software. Steps of the methods disclosed with reference to the embodiments of the present disclosure may be directly performed and implemented by a hardware processor, or may be performed and implemented by using a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory 530. The processor 510 reads information in the memory 530, and implements the steps of the foregoing method in combination with hardware of the memory 530. To avoid repetition, details are not described herein.

Optionally, as an embodiment, when the channel parameter from the transmit antenna of the second apparatus to the receive antenna of the apparatus 500 is determined, the receiver 520 is further configured to: receive, a second interference signal by using a second resource, where the second interference signal is an interference signal generated when a downlink third signal is sent on the second resource by the second apparatus, and on the second resource, there is no uplink signal sent to the first apparatus; and receive reconstruction information that is of the third signal and that is sent by the second apparatus, where a resource used for sending the reconstruction information of the third signal by the second apparatus is different from the second resource. The processor 510 is specifically configured to: determine the channel parameter from the transmit antenna of the second apparatus to the receive antenna of the apparatus 500 according to the second interference signal and the reconstruction information of the third signal.

Optionally, as a specific embodiment, the reconstruction information that is of the second signal and that is received by the receiver 520 includes: an unmodulated digital baseband signal and a modulation scheme that are corresponding to the second signal; and the reconstruction information that is of the third signal and that is received by the receiver 520 includes: an unmodulated digital baseband signal and a modulation scheme that are corresponding to the third signal.

Optionally, the reconstruction information that is of the second signal and that is received by the receiver 520 further includes: a non-linear estimation of a radio frequency channel of the second signal; and the reconstruction information that is of the third signal and that is received by the receiver 520 further includes: a non-linear estimation of a radio frequency channel of the third signal.

Optionally, as another specific embodiment, the reconstruction information that is of the second signal and that is received by the receiver 520 includes: a radio frequency signal that is corresponding to the second signal; and the reconstruction information that is of the third signal and that is received by the receiver 520 includes: a radio frequency signal that is corresponding to the third signal.

It should be understood that, that the receiver 520 receives the reconstruction information that is of the third signal and that is sent by the second apparatus may include: receiving, by using an optical fiber, a microwave, or a cable, the reconstruction information that is of the third signal and that is sent by the second apparatus.

It should be understood that, that the receiver 520 receives the reconstruction information that is of the second signal and that is sent by the second apparatus may include: receiving, by the first apparatus by using an optical fiber, a microwave, or a cable, the reconstruction information that is of the second signal and that is sent by the second apparatus.

It should be further understood that the apparatus 500 for interference cancellation may be a base station, a relay station, an access point, or the like, or may be another apparatus that can perform or partially perform functions of a base station.

It should be further understood that the apparatus 500 according to this embodiment of the present disclosure may be corresponding to an entity for implementing a method of an embodiment of the present disclosure, and may further be corresponding to an apparatus 300 according to an embodiment of the present disclosure, and the foregoing and other operations and/or functions of the modules in the apparatus 500 are respectively used to implement corresponding procedures of the methods in FIG. 2 to FIG. 4. For brevity, details are not described herein.

Therefore, according to the apparatus for interference cancellation provided in this embodiment of the present disclosure, a channel parameter between apparatuses may be accurately estimated according to reconstruction information that is of a downlink signal and that is sent on a second resource by a second apparatus, and the channel parameter between apparatuses is applied in interference cancellation on a signal received on a first resource, so that a better interference cancellation effect may be obtained.

Figure 9:
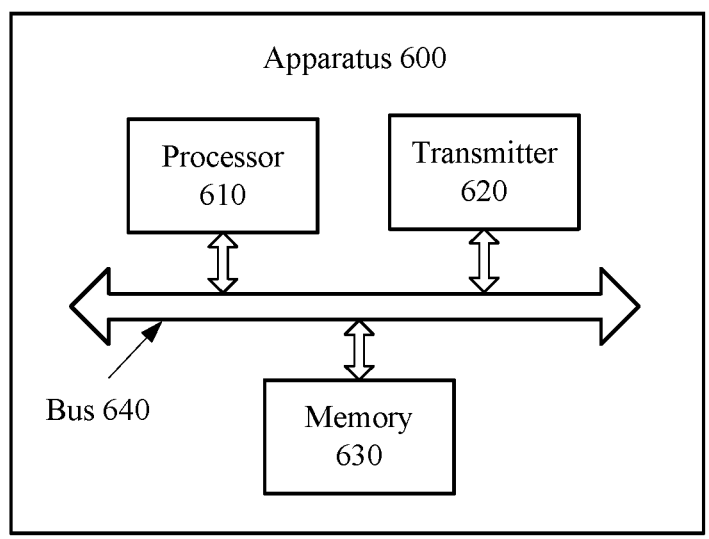
FIG. 9 is a schematic block diagram of an apparatus for interference cancellation according to another embodiment of the present disclosure.

FIG. 9 shows a schematic block diagram of an apparatus 600 for interference cancellation according to another embodiment of the present disclosure. As shown in FIG. 9, the apparatus 600 includes a processor 610, a transmitter 620, a memory 630, and a bus 640. The processor 610, the transmitter 620, and the memory 630 are connected by using the bus system 640. The memory 630 is configured to store an instruction. The processor 610 is configured to execute the instruction stored in the memory 630. The transmitter 620 is configured to: send, a downlink second signal by using a first resource, where a first apparatus receives a first signal by using the first resource, and the first signal includes: a first interference signal generated when the second signal is sent and an uplink wanted signal; and send reconstruction information of the second signal to the first apparatus, so that the first apparatus determines the first interference signal in the first signal according to the reconstruction information of the second signal and a channel parameter from a transmit antenna of the apparatus 600 to a receive antenna of the first apparatus, and cancels the first interference signal, where a resource used for sending the reconstruction information of the second signal by the apparatus 600 is different from the first resource.

Therefore, according to the apparatus for interference cancellation provided in this embodiment of the present disclosure, reconstruction information that is of a downlink signal and that is sent on a first resource by the apparatus is sent to a first apparatus, so that the first apparatus may implement, according to the reconstruction information and a channel parameter between apparatuses, cancellation of an interference signal between apparatuses on a signal received on the first resource.

It should be understood that in this embodiment of the present disclosure, the processor 610 may be a central processing unit (CPU), or the processor 610 may be another general purpose processor, a digital signal processor (DSP), an application-specific integrated circuit (ASIC), a field programmable gate array (FPGA), or another programmable logic device, a discrete gate or a transistor logic device, a discrete hardware assembly, or the like. The general purpose processor may be a microprocessor, or the processor may also be any conventional processor, or the like.

The memory 630 may include a read-only memory and a random access memory, and provide an instruction and data to the processor 610. A part of the memory 630 may further include a non-volatile random access memory. For example, the memory 630 may further store information about a device type.

In addition to a data bus, the bus system 640 may further include a power bus, a control bus, a status signal bus, and the like. However, for clarity of description, various buses are marked as the bus system 640 in the figure.

In an implementation process, steps in the foregoing method may be implemented by using an integrated logic circuit of hardware in the processor 610 or an instruction in a form of software. Steps of the methods disclosed with reference to the embodiments of the present disclosure may be directly performed and implemented by a hardware processor, or may be performed and implemented by using a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory 630. The processor 610 reads information in the memory 630, and implements the steps of the foregoing method in combination with hardware of the memory 630. To avoid repetition, details are not described herein.

Optionally, as an embodiment, to facilitate determining the channel parameter between apparatuses by the first apparatus, the transmitter 620 is further configured to: send, on a second resource, a downlink third signal, where on the second resource, there is no uplink signal sent to the first apparatus, and the first apparatus receives, on the second resource, a second interference signal generated when the third signal is sent; and send reconstruction information of the third signal to the first apparatus, so that the first apparatus determines the channel parameter from the transmit antenna of the second apparatus to the receive antenna of the first apparatus according to the reconstruction information of the third signal and the second interference signal, where a resource used for sending the reconstruction information of the third signal by the second apparatus is different from the second resource.

Optionally, as a specific embodiment, the reconstruction information that is of the second signal and that is sent by the transmitter 620 includes: an unmodulated digital baseband signal and a modulation scheme that are corresponding to the second signal; and the reconstruction information that is of the third signal and that is sent by the transmitter 620 includes: an unmodulated digital baseband signal and a modulation scheme that are corresponding to the third signal.

Optionally, the reconstruction information that is of the second signal and that is sent by the transmitter 620 further includes: a non-linear estimation of a radio frequency channel of the second signal; and the reconstruction information that is of the third signal and that is sent by the transmitter 620 further includes: a non-linear estimation of a radio frequency channel of the third signal.

Optionally, as another specific embodiment, the reconstruction information that is of the second signal and that is sent by the transmitter 620 includes: a radio frequency signal that is corresponding to the second signal; and the reconstruction information that is of the third signal and that is sent by the transmitter 620 includes: a radio frequency signal that is corresponding to the third signal.

It should be understood that, that the transmitter 620 sends the reconstruction information of the third signal to the first apparatus may include: sending the reconstruction information of the third signal to the first apparatus by using an optical fiber, a microwave, or a cable.

It should be understood that, that the transmitter 620 sends the reconstruction information of the second signal to the first apparatus may include: sending the reconstruction information of the second signal to the first apparatus by using an optical fiber, a microwave, or a cable.

It should be further understood that the apparatus 600 for interference cancellation may be a base station, a relay station, an access point, or the like, or may be another apparatus that can perform or partially perform functions of a base station.

It should be further understood that the apparatus 600 according to this embodiment of the present disclosure may be corresponding to an entity for implementing a method of an embodiment of the present disclosure, and may be further corresponding to the apparatus 400 according to an embodiment of the present disclosure, and the foregoing and other operations and/or functions of the modules in the apparatus 600 are respectively used to implement corresponding procedures of the methods in FIG. 2 to FIG. 4. For brevity, details are not described herein.

Therefore, according to the apparatus for interference cancellation provided in this embodiment of the present disclosure, reconstruction information that is of a downlink signal and that is sent on a second resource by an apparatus is sent to a first apparatus, so that the first apparatus may accurately estimate a channel parameter between apparatuses according to the reconstruction information, and the channel parameter between apparatuses is applied in interference cancellation on a signal received on a first resource, so that a better interference cancellation effect may be obtained.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   determining, by a first base station, a channel parameter from a transmit antenna of a second base station to a receive antenna of the first base station;
   receiving, by the first base station, a first signal using a first resource, wherein the first signal comprises a first interference signal and an uplink signal, and the first interference signal is an interference signal generated when a second signal is sent by the second base station using the first resource;
   receiving, by the first base station, reconstruction information of the second signal that is sent by the second base station, wherein a resource used for sending the reconstruction information of the second signal is different from the first resource; and
   determining, by the first base station, the first interference signal in the first signal according to the channel parameter and the reconstruction information of the second signal, and canceling the first interference signal.

2. The method according to claim 1, wherein determining the channel parameter comprises:
   receiving, by the first base station, a second interference signal using a second resource, wherein the second interference signal is an interference signal generated when a third signal is sent by the second base station using the second resource, and there is no uplink signal sent to the first base station using the second resource;
   receiving, by the first base station, reconstruction information of the third signal from the second base station, wherein a resource used for sending the reconstruction information of the third signal is different from the second resource; and
   determining, by the first base station, the channel parameter according to the second interference signal and the reconstruction information of the third signal.

3. The method according to claim 2, wherein the reconstruction information of the second signal comprises an unmodulated digital baseband signal and a modulation scheme that correspond to the second signal; and
   wherein the reconstruction information of the third signal comprises an unmodulated digital baseband signal and a modulation scheme that correspond to the third signal.

4. The method according to claim 2, wherein the reconstruction information of the second signal comprises a radio frequency signal that corresponds to the second signal; and
   wherein the reconstruction information of the third signal comprises a radio frequency signal that corresponds to the third signal.

5. A method, comprising:
   sending, by a second base station, a second signal using a first resource, wherein a first base station receives a first signal using the first resource, and the first signal comprises: a first interference signal generated when the second signal is sent and an uplink signal; and
   sending, by the second base station, reconstruction information of the second signal to the first base station, so that the first base station determines the first interference signal in the first signal according to the reconstruction information of the second signal and a channel parameter from a transmit antenna of the second base station to a receive antenna of the first base station, and cancels the first interference signal, wherein a resource used for sending the reconstruction information of the second signal is different from the first resource.

6. The method according to claim 5, further comprising:
   sending, by the second base station using a second resource, a third signal, wherein no uplink signal is sent to the first base station using the second resource;
   receiving, by the first base station on the second resource, a second interference signal generated when the third signal is sent; and
   sending, by the second base station, reconstruction information of the third signal to the first base station, so that the first base station determines the channel parameter according to the reconstruction information of the third signal and the second interference signal, wherein a resource used for sending the reconstruction information of the third signal is different from the second resource.

7. The method according to claim 6, wherein the reconstruction information of the second signal comprises an unmodulated digital baseband signal and a modulation scheme that corresponds to the second signal; and
   wherein the reconstruction information of the third signal comprises an unmodulated digital baseband signal and a modulation scheme that correspond to the third signal.

8. The method according to claim 6, wherein the reconstruction information of the second signal comprises a radio frequency signal that correspond to the second signal; and
   wherein the reconstruction information of the third signal comprises a radio frequency signal that corresponds to the third signal.

9. An apparatus for interference cancellation, comprising:
   a processor;
   a receiver; and
   a bus;
   wherein the processor and the receiver are connected by the bus;

wherein the processor is configured to determine a channel parameter from a transmit antenna of a second apparatus to a receive antenna of the apparatus;

wherein the receiver is configured to receive a first signal using a first resource, wherein the first signal comprises a first interference signal and an uplink signal, and the first interference signal is generated when a second signal is sent on the first resource by the second apparatus;

wherein the receiver is further configured to receive reconstruction information of the second signal and that is sent by the second apparatus, wherein a resource used for sending the reconstruction information of the second signal is different from the first resource; and wherein the processor is configured to determine the first interference signal in the first signal according to the channel parameter and the reconstruction information of the second signal, and cancel the first interference signal.

10. The apparatus according to claim 9, wherein:
the processor is further configured to:
receive a second interference signal using a second resource, wherein the second interference signal is generated when a third signal is sent on the second resource by the second apparatus, and wherein there is no uplink signal sent to the apparatus using the second resource; and
determine the channel parameter according to the second interference signal and the reconstruction information of the third signal;
the receiver is configured to receive reconstruction information of the third signal, wherein a resource used for sending the reconstruction information of the third signal is different from the second resource.

11. The apparatus according to claim 10, wherein the reconstruction information of the second signal comprises an unmodulated digital baseband signal and a modulation scheme that correspond to the second signal; and
wherein the reconstruction information of the third signal comprises an unmodulated digital baseband signal and a modulation scheme that correspond to the third signal.

12. The apparatus according to claim 10, wherein the reconstruction information of the second signal comprises: a radio frequency signal that corresponds to the second signal; and
wherein the reconstruction information of the third signal comprises a radio frequency signal that corresponds to the third signal.

13. An apparatus, comprising:
a processor;
a transmitter;
a memory; and
a bus;
wherein the processor and the transmitter are connected by the bus;
wherein the transmitter is configured to send a second signal using a first resource, wherein a first apparatus receives a first signal using the first resource, and the first signal comprises a first interference signal generated when the second signal is sent and an uplink signal; and
wherein the transmitter is configured to send reconstruction information of the second signal to the first apparatus, so that the first apparatus determines the first interference signal in the first signal according to the reconstruction information of the second signal and a channel parameter from a transmit antenna of the apparatus to a receive antenna of the first apparatus, and cancels the first interference signal, wherein a resource used for sending the reconstruction information of the second signal is different from the first resource.

14. The apparatus according to claim 13, wherein the transmitter is further configured to:
send, on a second resource, a third signal, wherein no uplink signal is sent to the first apparatus on the second resource, and the first apparatus receives, on the second resource, a second interference signal generated when the third signal is sent; and
send reconstruction information of the third signal to the first apparatus, so that the first apparatus determines the channel parameter according to the reconstruction information of the third signal and the second interference signal, wherein a resource for sending the reconstruction information of the third signal is different from the second resource.

15. The apparatus according to claim 14, wherein the reconstruction information of the second signal comprises an unmodulated digital baseband signal and a modulation scheme that correspond to the second signal; and
wherein the reconstruction information of the third signal comprises an unmodulated digital baseband signal and a modulation scheme that correspond to the third signal.

16. The apparatus according to claim 14, wherein the reconstruction information of the second signal comprises a radio frequency signal that corresponds to the second signal; and
wherein the reconstruction information of the third signal comprises a radio frequency signal that corresponds to the third signal.

* * * * *